No. 619,630. Patented Feb. 14, 1899.
C. SNYDER.
HOE.
(Application filed June 22, 1898.)
(No Model.)
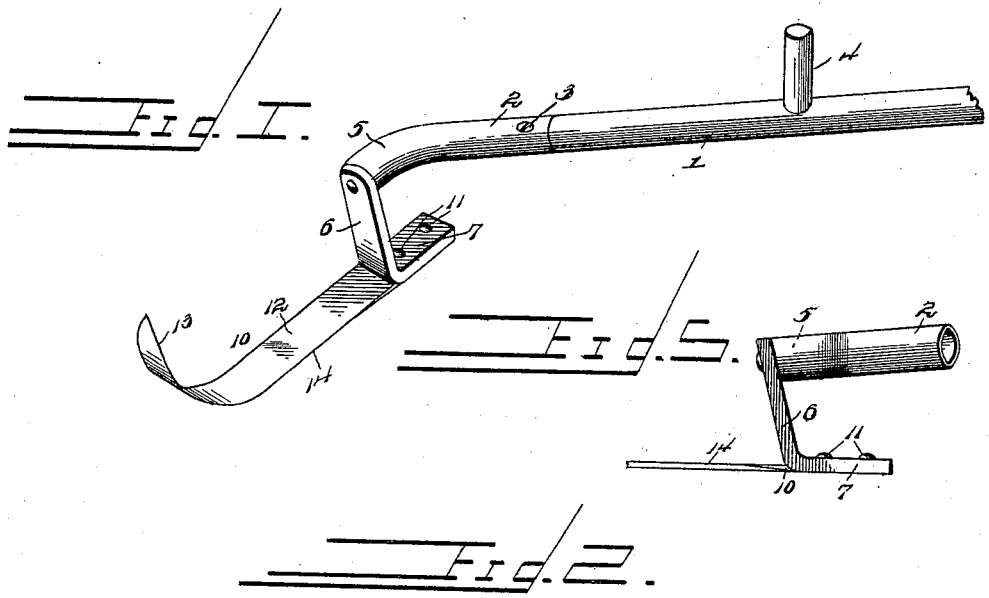
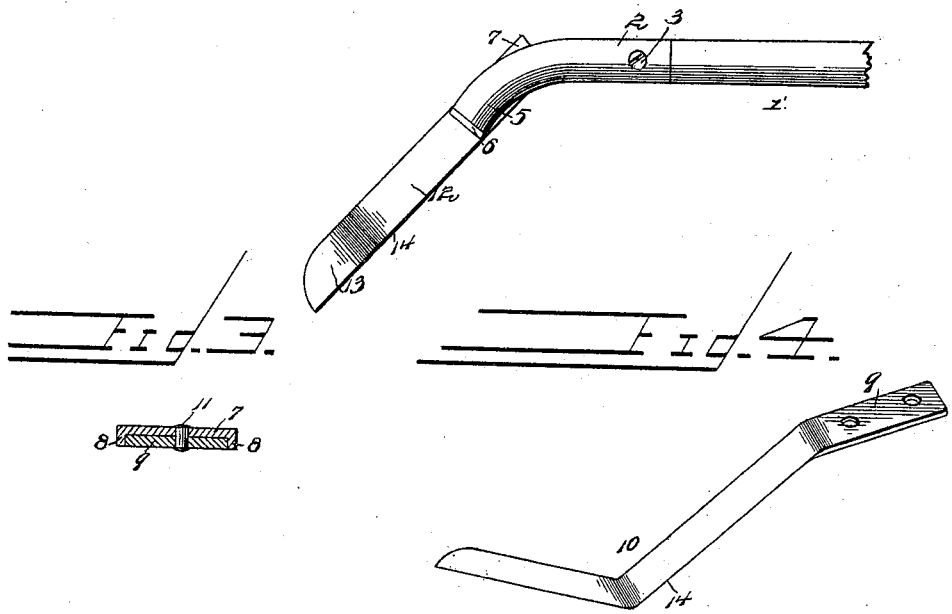
Witnesses
R. H. Shepard
H. H. Shepard
By his Attorneys,
C. A. Snow & Co.
Calvin Snyder Inventor
THE NORRIS PETERS CO., PHOTO-LITHO., WASHINGTON, D. C.

UNITED STATES PATENT OFFICE.

CALVIN SNYDER, OF TIFFIN, OHIO.

HOE.

SPECIFICATION forming part of Letters Patent No. 619,630, dated February 14, 1899.

Application filed June 22, 1898. Serial No. 684,161. (No model.)

*To all whom it may concern:*

Be it known that I, CALVIN SNYDER, a citizen of the United States, residing at Tiffin, in the county of Seneca and State of Ohio, have invented a new and useful Sod-Cutting Implement, of which the following is a specification.

This invention relates to sod-cutting implements; and the object thereof is to provide a tool or implement for cutting beneath the surface and at the same time trimming the sod away from the sides of paths or walks and from flower-beds and the like.

With this object in view the present invention consists in the novel construction and arrangement of the several parts thereof, which will hereinafter be more fully described, shown in the drawings, and particularly pointed out in the claims.

In the drawings, Figure 1 is a perspective view of the invention. Fig. 2 is a top plan view of the cutting-blade and socket. Fig. 3 is a detail sectional view showing the manner of mounting the cutting-blade. Fig. 4 is a detail view of a modified form of blade. Fig. 5 is a detail front elevation showing the relation of the socket, the blade, and the attaching-leg.

Corresponding parts in the several figures are denoted by like characters of reference.

Referring to the drawings, 1 designates a wooden handle of suitable length so as to use the device without stooping, and 2 a metallic socket into which the end of the handle fits and is retained therein by a screw 3. The handle is also provided with a transverse hand-grasp 4 to facilitate the use of the implement. The socket 2 is formed straight for a suitable distance to receive the handle and is then formed into an arm 5, arranged at an obtuse angle, but in the same horizontal plane as the body of the socket. Depending from the outer end of arm 5 is a leg 6, inclined backward or toward the handle and provided at its lower end with a heel 7, projecting rearwardly and arranged to be parallel with the ground when the device is in use. This heel is provided with [depending side flanges 8, Fig. 3, and the rear end or shank 9 of the blade 10 is arranged between these flanges and secured to the under side of the heel by rivets 11 or other suitable means.

The blade is formed with a flat portion 12, extending from the rear end thereof, and is curved or bent upwardly at its outer end, forming an approximately upright trimming-arm 13. The inner edge of the blade is sharpened, as at 14, forming the cutting edge, and the entire blade is set at an obtuse angle to the handle. (See Fig. 2.) The cutting edge of the trimming-arm is continuous with the blade.

In operating the device the end of the handle is held in one hand and the hand-grasp 4 in the other, with the blade extending transversely in front of the operator. The flat portion of the blade is held parallel with and as near to the path or flower-bed as possible, with the outer end of the blade overlapping the sod as much as desired to be trimmed. Then by drawing the device toward you the upright end of the blade cuts or trims the sod at the side, while the flat portion thereof cuts beneath the surface of the sod, and thereby removes the same from the ground. By extending the blade more or less over the edge of the path or flower-bed any desired amount of trimming may be had.

Sometimes instead of leaving a flat trimmed edge around the flower-bed or at the side of a path a small trench is desired, and then an approximately V-shaped blade is used, as shown in Fig. 4, which will cut away the sod and leave a depression or trench.

The socket, leg, and blade of the device are made of metal. The socket and leg may be formed in one piece, or they may be separate and secured together in any desired manner. The leg is preferably arranged at an angle, as shown, in order to incline the handle upward when the blade is on the ground.

The construction and arrangement as herein described provide a simple and useful sod-trimming device which can be effectively used without stooping and straining the back of the operator.

Changes in the form, proportion, and minor details may be made without departing from the spirit and scope or sacrificing any of the advantages of the invention, and therefore I do not wish to be understood as limiting myself to the precise construction and arrangement as herein described.

Having thus described the invention, what is claimed as new, and desired to be secured by Letters Patent, is—

1. In an implement of the class described, the combination of a handle, a socket having one end deflected in the plane thereof, a pendent leg connected to the outer end of the socket and provided at its lower end with a heel extending transversely beneath the socket, and a cutting-blade having an attaching-shank in the same plane therewith and connected flush across the lower face of the heel, whereby the blade is disposed obliquely beneath and entirely at one side of the handle, substantially as shown and described.

2. In an implement of the class described, the combination with a handle, of an approximately L-shaped leg pendent from the handle and having a heel at its lower end, which latter is provided with longitudinal depending flanges, and a blade having its shank fitted flush against the lower face of the heel between and in engagement with the flanges, and fastenings passing through the shank and the heel, whereby the latter are connected together and the blade is prevented from being turned upon the heel, substantially as shown and described.

In testimony that I claim the foregoing as my own I have hereto affixed my signature in the presence of two witnesses.

CALVIN SNYDER.

Witnesses:
LOUIS SKRANSEWFKY,
E. E. WILLIAMS.